United States Patent Office 2,812,330
Patented Nov. 5, 1957

2,812,330

SULFONE DERIVATIVES OF 2,6-PIPERIDINE-DIONE

Raymond M. Dodson, Park Ridge, Ill., assignor to G. D. Searle & Co., Chicago, Ill., a corporation of Delaware No Drawing. Application May 2, 1956, Serial No. 582,089

9 Claims. (Cl. 260—293.4)

The present invention relates to heterocyclic sulfones, and is specifically concerned with 3,3-disubstituted 2,6-piperidinediones of the structural formula

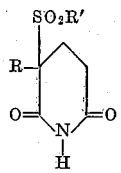

wherein R represents a phenyl or halophenyl radical and R' represents a lower alkyl, phenyl, or halophenyl radical. The compounds of the present invention can be regarded as substitution products of piperidine or of glutarimide.

The term "halophenyl" is defined herein to include not only such monohalogenated phenyl radicals as o-chlorophenyl, m-chlorophenyl, p-chlorophenyl, the corresponding bromophenyl radicals, the corresponding iodophenyl radicals, and the corresponding fluorophenyl radicals, but also polyhalogenated phenyl radicals such as 2,4-dichlorophenyl, 3,4-dichlorophenyl, 3,5-dibromophenyl and 2,4,5-trichlorophenyl radicals. When R' in the foregoing structural formula is a lower alkyl radical, it can represent methyl, ethyl, propyl, butyl, amyl, hexyl, heptyl, octyl, or branched-chain isomers thereof.

A starting material suitable for the manufacture of compounds of this invention is α-cyanobenzyl benzenesulfonate of the formula

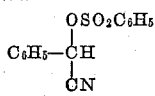

which can be prepared by the procedure of Journal of the American Chemical Society, 73, 4517 (1951). In this and subsequent structural formulas appearing herein, the term C₆H₅ represents a phenyl radical. By the reaction of α-cyanobenzyl benzenesulfonate in a polar solvent such as acetone with thiourea and asulfonyl chloride of the formula R'SO₂Cl R' being defined as hereinbefore, there is obtained an α,α-disubstituted acetonitrile of the formula

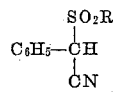

The compound thus obtained is then reacted with acrylonitrile in the presence of a basic catalyst, whereby there results an α,α-disubstituted pentanedinitrile of the formula

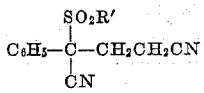

Upon reaction with concentrated sulfuric acid and subsequent treatment with water and acetic acid the pentanedinitrile derivative undergoes partial hydrolysis and ring closure with the formation of a 3,3-disubstituted 2,6-piperidinedione of the formula

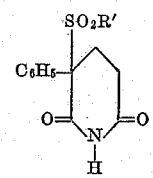

In the final reaction product the group R' is a lower alkyl, phenyl, or halophenyl radical, accordingly as the sulfonyl chloride R'SO₂Cl employed in the reaction sequence is an alkanesulfonyl chloride such as methanesulfonyl chloride or ethanesulfonyl chloride; benzenesulfonyl chloride; or a halobenzenesulfonyl chloride.

Other compositions of this invention are obtained by substitution for the α-cyanobenzyl benzenesulfonate of a halogenated α-cyanobenzyl benzenesulfonate of the formula

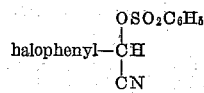

wherein "halophenyl," as before, represents either a monohalogenated or a polyhalogenated phenyl radical. Compounds of this type can be prepared by the reaction of stoichiometric amounts of a halogenated benzaldehyde, benzenesulfonyl chloride and sodium cyanide in an aqueous medium. Typical of the halogenated benzaldehydes which can be employed are p-chlorobenzaldehyde, 2,4-dichlorobenzaldehyde, p-iodobenzaldehyde, p-fluorobenzaldehyde, and 3,5-dibromobenzaldehyde.

The compounds of the present invention have valuable pharmacological properties. In consequence of certain anti-hormonal effects which they can produce, they can be employed as useful adjuncts in hormonal therapy. Thus, these compounds exhibit selective anti-cortisone action, and upon administration with cortisone, they inhibit the liver deposition of glycogen produced by this hormone. They also display marked anti-infective, and in particular anti-viral properties. As a specific example of their use, they can be administered with cortisone to inhibit the ability of cortisone to promote a Coxsackie virus infection. An additional use of these compounds results from their effect on circulating lipids. Their administration causes a reduction in the serum ratio of cholesterol to phospholipids, and in consequence of this effect the compounds are useful in the treatment of hypercholesterolemia and disorders associated therewith.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials, except where otherwise indicated, in parts by weight.

Example 1

A mixture of 106 parts of benzaldehyde, 176 parts of benzenesulfonyl chloride, 49 parts of sodium cyanide, and 200 parts of water is maintained with stirring at 0–5° C. for 2½ hours. The precipitate which forms is recovered on a filter, washed thereon with water, and then dissolved in 560 parts of acetone. To this solution, with agitation and cooling is added 176 parts of benzenesulfonyl chloride, followed portion-wise by 152 parts of thiourea. The slurry which forms is stirred for 1 hour and then allowed to stand for about 18 hours. The mixture is diluted with 750 parts of water, stirred, and filtered, in that order. The precipitate thus recovered is washed by suspension in water and then isolated by filtration, whereupon it is dissolved in dilute potassium hydroxide solution. A small amount of insoluble material is removed by filtration, and the filtrate is acidified with acetic acid. The product which precipitates is crystallized from aqueous acetone, whereby there is obtained α-phenyl-α-phenylsulfonylacetonitrile which melts at about 149–150.5° C. and has the formula

A solution of 10.3 parts of α-phenyl-α-phenylsulfonylacetonitrile and 4.5 parts of potassium hydroxide in 100 parts of water is treated with 2.4 parts of acrylonitrile. A precipitate forms immediately. After 1 hour this product is collected on a filter and washed well with water. It is α-phenyl-α-phenylsulfonylpentanedinitrile which melts at about 186–188° C. and has the structural formula

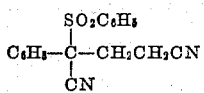

A solution of 6 parts of α-phenyl-α-phenylsulfonylpentanedinitrile in 75 parts of concentrated sulfuric acid is allowed to stand at about 25° C. for 1 hour. It is then cooled in an ice bath and cautiously diluted with 80 parts of water. Glacial acetic acid (105 parts) is added, and the mixture is heated under reflux for 2 hours, after which the mixture is cooled and poured into several times its volume of ice water. The insoluble product is collected on a filter and crystallized, after decolorization with activated carbon, from aqueous methanol. A solution of the product thus obtained in 200 parts of 3% potassium hydroxide solution is filtered from an insoluble residue and treated with solid carbon dioxide in order to reprecipitate the desired compound. It is collected on a filter and recrystallized from aqueous methanol, whereby there is obtained purified 3-phenyl-3-phenylsulfonyl-2,6-piperidinedione, which melts at about 200–202° C. It has the structural formula

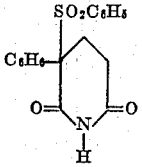

*Example 2*

To a stirred solution of 55 parts of α-cyanobenzyl benzenesulfonate and 23 parts of methanesulfonyl chloride in 80 parts of acetone is added, portion-wise with agitation over a 25-minute period, 30 parts of thiourea. The mixture is allowed to stand at about 25° C. for 24 hours. The cream-colored precipitate is separated by filtration and extracted with acetone. The extract and the filtrate are combined, whereupon sufficient water is added to cause slight turbidity at the boiling point. Upon cooling and standing, α-phenyl-α-methylsulfonylacetonitrile separates in good yield. By recrystallization from ethanol there is obtained the purified compound which melts at about 117–117.5° C. and has the structural formula

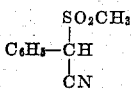

To a solution of 19.5 parts of α-phenyl-α-methylsulfonylacetonitrile and 11.2 parts of potassium hydroxide in 200 parts of water there is gradually added 5.8 parts of acrylonitrile. The mixture is stirred for 2 hours at about 25° C., during which time the reaction product separates as an oil. The oily product is separated and washed by decantation with water. It is then dissolved in a mixture of ethyl acetate and ether, and the solution is dried, filtered, and concentrated to dryness under reduced pressure. There is thus obtained an oily residue of α-phenyl-α-methylsulfonylpentanedinitrile of the structural formula

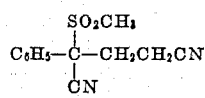

A solution of 18.9 parts of α-phenyl-α-methylsulfonylpentanedinitrile in 110 parts of concentrated sulfuric acid is allowed to stand for 1 hour at about 25° C. With external cooling, 180 parts of water is cautiously added, and the mixture is heated to boiling. Glacial acetic acid (32 parts) is added and heating under reflux is continued for 3 hours. The cooled mixture is then poured into ice water, with stirring. When crystallization is complete, the product is collected on a filter and washed with water. This compound is 3-phenyl-3-methylsulfonyl-2,6-piperidinedione which, after recrystallization from methanol, melts at about 203–205.5° C. It has the structural formula

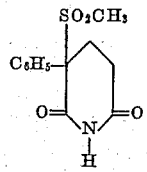

*Example 3*

To a stirred solution of 27 parts of α-cyanobenzyl benzenesulfonate and 13 parts of ethanesulfonyl chloride in 40 parts of acetone is added, portion-wise with agitation over a 30-minute period, 15 parts of thiourea. The mixture is allowed to stand at about 25° C. for 30 minutes, whereupon 40 parts of ethanol is added, followed by sufficient water to dissolve the precipitate which has formed and bring the solution to the point of cloudiness again. This mixture is allowed to stand at about 25° C. for an additional 16 hours, after which it is diluted with water and extracted with ether. The ethereal solution is washed with water, filtered, and extracted with several portions of dilute potassium hydroxide solution. The alkaline extract is acidified with hydrochloric acid, and the precipitated product is collected on a filter and crystallized from aqueous methanol, whereby there is obtained α-phenyl-α-ethylsulfonylacetonitrile melting at about 79–80° C. A more highly purified material, obtained by additional crystallizations from aqueous methanol, melts at about 81–82° C. This compound has the structural formula

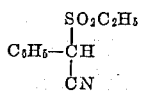

To a solution of 12.5 parts of α-phenyl-α-ethylsulfonylacetonitrile and 6.7 parts of potassium hydroxide in 100 parts of water there is added 3.5 parts of acrylonitrile. The mixture is stirred at about 25° C. for 1 hour, after which the insoluble, oily product is separated and washed by decantation with water. It is then dissolved in a mixture of ethyl acetate and ether containing equal parts by volume of each solvent component, and the resulting solution is washed with water, dried, filtered and concentrated to dryness under reduced pressure. There is thus obtained, as a viscous oil, α-phenyl-α-ethylsulfonylpentanedinitrile of the structural formula

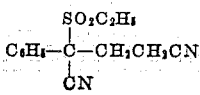

A solution of 14 parts of α-phenyl-α-ethylsulfonyl-pentanedinitrile in 92 parts of concentrated sulfuric acid is allowed to stand at about 25° C. for one and one-half hours, after which, with external cooling, it is cautiously diluted with 100 parts of water and 53 parts of acetic acid. The mixture is heated under reflux for 3 hours and is then cooled and poured, with stirring, into an excess of ice water. When crystallization of the insoluble product is complete, it is collected on a filter and then crystallized from aqueous methanol and from a mixture of acetone and cyclohexane. In this manner there is obtained 3-phenyl-3-ethylsulfonyl-2,6-piperidinedione which melts at about 190–191° C. and has the structural formula

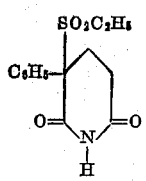

From the foregoing procedure for the reaction of α-cyanobenzyl benzenesulfonate, ethanesulfonyl chloride, and thiourea, with the substitution of 14.4 parts of 1-propanesulfonyl chloride for the ethanesulfonyl chloride, there is obtained α-phenyl-α-propylsulfonylacetonitrile. Substitution of 13.3 parts of this compound for the α-phenyl-α-ethylsulfonylacetonitrile in the procedure for the reaction of the latter compound with acrylonitrile affords α-phenyl-α-propylsulfonylpentanedinitrile, which by hydrolysis and ring closure under the conditions described for α-phenyl-α-ethylsulfonylpentanedinitrile, yields 3-phenyl-3-propylsulfonyl-2,6-piperidinedione of the formula

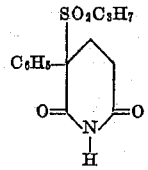

Example 4

To an intimate mixture of 88 parts of 2,4-dichlorobenzaldehyde and 88 parts of benzenesulfonyl chloride is added a solution of 25 parts of sodium cyanide in 75 parts of water. The initial evolution of heat is moderated with an ice bath, and the mixture is then maintained at 0–5° C. for 3 hours, with stirring. The aqueous phase is then separated and discarded, and the remaining oily residue is washed by decantation with several portions of water. This residue is then crystallized several times from mixtures of acetone, ethanol and ether to afford purified α-cyano-2,4-dichlorobenzyl benzenesulfonate melting at about 47.5–52° C. For use in the following reaction, the purified product is not necessary, and satisfactory results are obtained with a crude, oily product. This compound has the structural formula

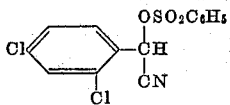

To a solution of 44.7 parts of α-cyano-2,4-dichlorobenzyl benzenesulfonate and 14.8 parts of methanesulfonyl chloride in 120 parts of acetone is gradually added 19.8 parts of thiourea. The mixture is stirred at about 25° C. for 4 hours, at the end of which time some precipitate is present. Ethanol (120 parts) is added followed by sufficient water to dissolve any precipitate present and then cause a new turbidity. The mixture is then heated under reflux to 2 hours, after which the resulting solution is diluted with water to the point of turbidity and allowed to cool and stand until separation of the insoluble product is complete. This product is collected and subjected to a preliminary purification by dissolving it in dilute potassium hydroxide solution and reprecipitating it with acetic acid. The product is then crystallized from aqueous ethanol, crystallized from aqueous acetone, again reprecipitated by acidification of a basic solution, and finally crystallized from aqueous acetone to yield α-(2,4-dichlorophenyl)-α-methylsulfonylacetonitrile which melts at about 148–150° C. and has the structural formula

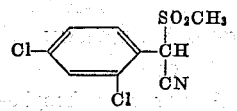

To a solution of 3.1 parts of α-(2,4-dichlorophenyl)-α-methylsulfonylacetonitrile and 1.4 parts of potassium hydroxide in 25 parts of water there is gradually added 1.5 parts of acrylonitrile. The mixture is allowed to stand at about 25° C. for 16 hours, after which the insoluble product is collected on a filter and washed with water. This compound is α-(2,4-dichlorophenyl)-α-methylsulfonylpentanedinitrile which melts at about 108–109.5° C. and has the structural formula

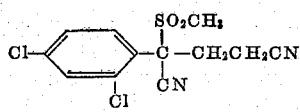

A solution of 1.95 parts of α-(-2,4-dichlorophenyl)-α-methylsulfonylpentanedinitrile in 28 parts of concentrated sulfuric acid is allowed to stand at about 25° C. for one and one-half hours. With external cooling, there are cautiously added 30 parts of water and then 16 parts of acetic acid, after which the mixture is heated under reflux for 2 hours, cooled, and poured into ice water with stirring. The insoluble product is collected on a filter, washed with water and crystallized from a mixture of acetone and cyclohexane and then from aqueous methanol. There is thus obtained purified 3-(2,4-dichlorophenyl)-3-methylsulfonyl-2,6-piperidinedione which undergoes a transition point with fusion at about 169.5–171° C., then resolidifies and melts at about 191–192° C. This compound has the structural formula

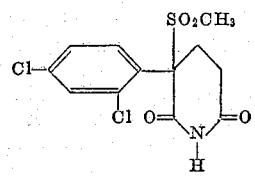

Example 5

To a stirred mixture of 65.5 parts of α-cyanobenzyl benzenesulfonate and 53 parts of p-chlorobenzenesulfonyl chloride in 120 parts of acetone there is gradually added 36 parts of thiourea, after which the mixture is allowed to stand at about 25° C. for 24 hours. The separated product is collected on a filter and extracted with acetone. The extract and the filtrate are combined and treated with sufficient water to precipitate the water-insoluble product. A solution of this product is dilute potassium hydroxide solution is filtered from an insoluble residue and acidified with acetic acid to reprecipitate the product, which is then collected and crystallized several times from aqueous acetone. There is thus obtained α-phenyl-α-(p-chlorophenylsulfonyl)-acetonitrile which melts at about 126–128° C. and has the structural formula

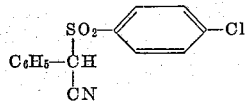

A solution of 10.0 parts of α-phenyl-α-(p-chlorophenylsulfonyl)acetonitrile and 3.9 parts of potassium hydroxide in 100 parts of water and 40 parts of methanol is treated with 2.1 parts of acrylonitrile. After the mixture has stood for 3 hours at about 25° C., it is diluted with 250 parts of water and filtered. The solid product is washed with water and crystallized from aqueous acetone or from aqueous methanol to yield α-phenyl-α-(p-chlorophenylsulfonyl)pentanedinitrile which melts at about 131–132° C. and has the structural formula

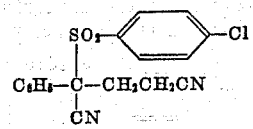

A solution of 6 parts of α-phenyl-α-(p-chlorophenylsulfonyl)pentanedinitrile in 75 parts of concentrated sulfuric acid is allowed to stand at about 25° C. for one and one-half hours. It is then cooled in an ice bath and cautiously diluted with 80 parts of water. Glacial acetic acid (105 parts) is added, and the mixture is heated under reflux for 3 hours. It is then cooled and poured into ice water to precipitate the product, which is collected on a filter and washed with water. A solution of this product in 100 parts of 6% potassium hydroxide solution is filtered from a small amount of insoluble residue and treated with solid carbon dioxide in order to reprecipitate the desired compound. This reprecipitated product is collected and crystallized from a mixture of methanol and benzene and then from aqueous acetone to afford 3-phenyl-3-(p-chlorophenylsulfonyl)-2,6-piperidinedione which melts at about 223° C. and has the structural formula

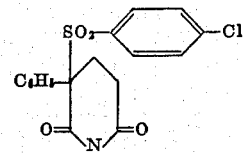

*Example 6*

A mixture of 50 parts of p-chlorobenzaldehyde, 63 parts of benzenesulfonyl chloride, 17 parts of sodium cyanide and 70 parts of water is allowed to stand for 3 hours at 0–5° C. with occasional stirring. Cooling is then discontinued and the reaction mixture is allowed to stand for an additional hour at about 25° C. The oily reaction product is separated and washed by decantation with several portions of water. It is crude α-cyano-p-chlorobenzyl benzenesulfonate of the formula

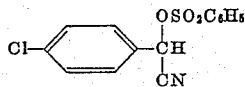

A solution of the crude α-cyano-p-chlorobenzyl benzenesulfonate as prepared immediately hereinabove in 240 parts of acetone is treated with 72 parts of p-chlorobenzenesulfonyl chloride and then, in portions, with a total of 58 parts of thiourea. The exothermic reaction is moderated with a cooling bath, and the mixture is stirred for about 3 hours at 20–25° C. Ethanol (200 parts) is added, followed by sufficient water just to dissolve the precipitated product. The mixture is then heated under reflux for 1 hour, during which time a dense precipitate forms. The cooled suspension is extracted with several portions of ether, and the ethereal solution is extracted with several portions of dilute potassium hydroxide solution. This aqueous phase is acidified, whereupon the crude reaction product separates from solution. By repeated crystallizations from aqueous acetone there is then obtained α-(p-chlorophenyl)-α-(p-chlorophenylsulfonyl)-acetonitrile which melts at about 145–147° C. and has the structural formula

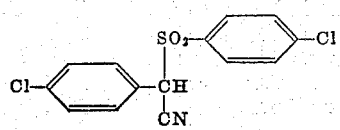

To a solution of 10.0 parts of α-(p-chlorophenyl)-α-(p-chlorophenylsulfonyl)acetonitrile and 6.7 parts of potassium hydroxide in 150 parts of water there is added 1.9 parts of acrylonitrile. After the mixture is stirred for 16 hours at about 25° C., the insoluble product is collected on a filter and washed with water. For subsequent operations it can be used without further purification. Purification can be accomplished by crystallization from aqueous acetone, whereby there is obtained α - (p-chlorophenyl) - α - (p-chlorophenylsulfonyl)pentanedinitrile melting at about 140–141° C. This compound has the structural formula

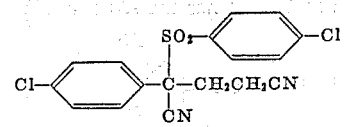

A mixture of 9 parts of α-(p-chlorophenyl)-α-(p-chlorophenylsulfonyl)pentanedinitrile in 75 parts of concentrated sulfuric acid is shaken intermittently at about 25° C. for 3 hours, during which time most of the starting material dissolves. With external cooling and caution, there are then added 80 parts of water followed by 200 parts of acetic acid, and the mixture is heated under reflux for 2 hours. The cooled mixture is poured into ice water, with stirring, and the precipitated product is collected on a filter and washed with water. By crystallization from aqueous acetone and then from a mixture of acetone and cyclohexane there is obtained 3-(p-chlorophenyl)-3-(p-chlorophenylsulfonyl)-2,6-piperidinedione which melts at about 258–259° C. and has the structural formula

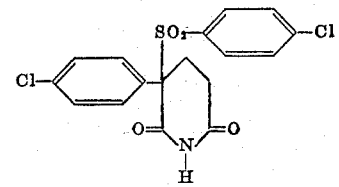

From the foregoing procedure for the reaction of p-chlorobenzaldehyde, benzenesulfonyl chloride and sodium cyanide in aqueous medium, with the substitution of 83 parts of p-iodobenzaldehyde for the p-chlorobenzaldehyde, there is obtained α-cyano-p-iodobenzyl benzenesulfonate. By reaction of this compound in acetone with 103 parts of p-iodobenzenesulfonyl chloride and 58 parts of thiourea, according to the method given for the corresponding reaction of α-cyano-p-chlorobenzyl benzenesulfonate and p-chlorobenzenesulfonyl chloride, there is obtained α-(p-iodophenyl)-α-(p-iodophenylsulfonyl) acetonitrile. Substitution of 15.6 parts of this compound for the α-(p-chlorophenyl)-α-(p-chlorophenylsulfonyl)acetonitrile in the procedure for the reaction of the latter compound with acrylonitrile affords α-(p-iodophenyl)-α-(p-iodophenylsulfonyl)pentanedinitrile, which, by hydrolysis and ring closure under the conditions described for α-(p-chlorophenyl) - α - (p-chlorophenylsulfonyl)pentanedinitrile, yields 3-(p-iodophenyl)-3-(p-iodophenylsulfonyl)-2,6-piperidinedione of the formula

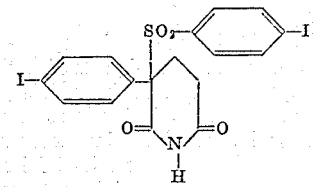

*Example 7*

A mixture of 88 parts of 3,4-dichlorobenzaldehyde and 88 parts of benzenesulfonyl chloride is heated at 85–100° C. until solution is complete. The solution is cooled to room temperature, whereupon a thick paste results. To this paste, with external cooling, is added a solution of 25 parts of sodium cyanide in 75 parts of water. The mixture is stirred at about 0–5° C. for 3 hours, after which the oily reaction product is separated and washed by decantation with several portions of water. This product is crude α-cyano-3,4-dichlorobenzyl benzenesulfonate of the structural formula

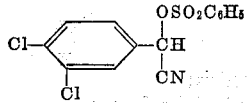

To a solution of 192 parts of α-cyano-3,4-dichlorobenzyl benzenesulfonate and 53 parts of benzenesulfonyl chloride in 320 parts of acetone is added a total of 45 parts of thiourea in several portions. With external cooling as required, the mixture is stirred at about 20–25° C. for 3 hours. The resulting suspension is diluted with 160 parts of ethanol and then with sufficient water to dissolve most of the precipitated material and bring the mixture to the dilution point at which there is incipient formation of a new precipitate. This mixture is then heated under reflux for 30 minutes, during which time a clear solution results. Hot water is added to the point of turbidity, and the mixture is allowed to cool and stand until separation of the solid reaction product is complete. The solid product is collected on a filter and then dissolved in an ethereal extract of the filtrate. This ethereal solution is extracted with several portions of 3% potassium hydroxide solution, and the basic extract is acidified with acetic acid. The acidified mixture is stirred until the precipitated product, which is initially oily, granulates. This granular product is redissolved in dilute potassium hydroxide solution; the solution is filtered and treated with acetic acid to reprecipitate the product. The reprecipitated material is crystallized, with decolorization, from aqueous acetone, whereby there is obtained α-(3,4-dichlorophenyl)-α-phenylsulfonylacetonitrile which melts at about 155–157° C. and has the structural formula

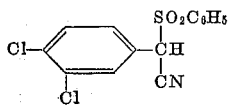

Acrylonitrile (1.9 parts) is added to a solution of 10 parts of α-(3,4-dichlorophenyl)-α-phenylsulfonylacetonitrile and 6.7 parts of potassium hydroxide in 150 parts of water, and the resulting mixture is allowed to stand at about 25° C., with occasional stirring, for 48 hours. The organic product is then extracted with several portions of ether, and the combined ethereal extract is washed with water and concentrated to dryness. There is thus obtained α-(3,4-dichlorophenyl)-α-phenylsulfonylpentanedinitrile which, after crystallization from aqueous acetone or from aqueous methanol, melts at about 122–123° C. This compound has the structural formula

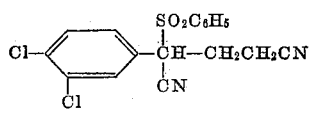

A mixture of 7.1 parts of α-(3,4-dichlorophenyl)-α-phenylsulfonylpentanedinitrile, 75 parts of concentrated sulfuric acid, 80 parts of water, and 210 parts of acetic acid is heated under reflux for 2 hours. The suspension is cooled and diluted with water until separation of insoluble material is complete. This insoluble material is collected and extracted with a solution of 7 parts of potassium hydroxide in 200 parts of water. The resulting solution is filtered from neutral, insoluble material and then treated with solid carbon dioxide in order to precipitate the desired compound. The precipitated product is collected and crystallized successively from a mixture of ethanol and benzene, from dilute acetone, and finally from a mixture of acetone and cyclohexane, to afford 3-(3,4-dichlorophenyl)-3-phenylsulfonyl-2,6-piperidinedione which melts with decomposition at about 262–265° C. This compound has the structural formula

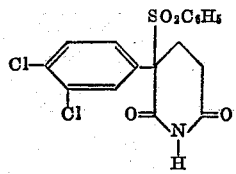

Example 8

An intimate mixture of 133 parts of 3,5-dibromobenzaldehyde and 88 parts of benzenesulfonyl chloride is treated with a solution of 25 parts of sodium cyanide in 75 parts of water, and the resulting mixture is stirred at about 0–10° C. for 3 hours. The residual, insoluble product, which consists substantially of α-cyano-3,5-dibromobenzyl benzenesulfonate, is separated and washed by decantation with several portions of water. This compound has the formula

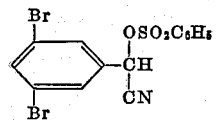

A mixture of the crude α-cyano-3,5-dibromobenzyl benzenesulfonate as prepared immediately hereinabove in 480 parts of acetone is treated with 125 parts of p-bromobenzenesulfonyl chloride and then, in portions, with a total of 76 parts of thiourea. With external cooling as required, the mixture is maintained at about 20–25° C. for 1 hour, then allowed to stand at room temperature for 16 hours. The mixture is then diluted with 500 parts of water, stirred thoroughly, and filtered to separate the insoluble product. This product is dissolved in 500 parts of a 10% potassium hydroxide solution; the solution is filtered from insoluble material and the filtrate is acidified, whereupon the crude reaction product precipitates from solution. This compound is α-(3,5-dibromophenyl)-α-(p-bromophenylsulfonyl)acetonitrile of the formula

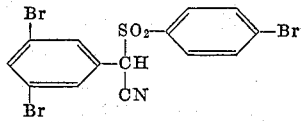

To a solution of 30 parts of α-(3,5-dibromophenyl)-α-(p-bromophenylsulfonyl)acetonitrile and 13.5 parts of potassium hydroxide in 350 parts of water there is added 4 parts of acrylonitrile. The mixture is stirred for 24 hours at about 25° C., after which the insoluble product is collected, washed with water, and dried. For subsequent operations it can be used without further purification. This compound is α-(3,5-dibromophenyl)-α-(p-bromophenylsulfonyl)pentanedinitrile of the formula

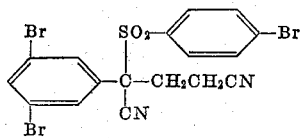

A mixture of 8 parts of α-(3,5-dibromophenyl)-α-(p-bromophenylsulfonyl)pentanedinitrile in 75 parts of concentrated sulfuric acid is stirred at about 25° C. for 4 hours. With external cooling and caution, the mixture is then diluted with 80 parts of water and 210 parts of acetic acid, after which it is heated under reflux for 3 hours. The cooled mixture is poured into ice water, with stirring, and the precipitated product is collected and washed with water. For purification it is dissolved in 200 parts of 3% potassium hydroxide solution and reprecipitated, from the filtered solution, by the addition of solid carbon dioxide. This compound is 3-(3,5-dibromophenyl)-3-(p-bromophenylsulfonyl)-2,6-piperidinedione which shows absorption bands in the infrared spectrum at about 3.1, 5.9, 7.6 and 8.7 microns and has the structural formula

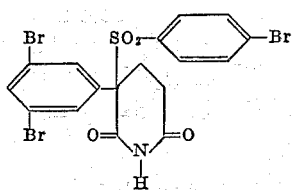

Example 9

A mixture of 124 parts of p-fluorobenzaldehyde, 176 parts of benzenesulfonyl chloride, 49 parts of sodium cyanide and 200 parts of water is allowed to stand for 3 hours at 0–5° C. with occasional stirring. Cooling is then discontinued and the reaction mixture is allowed to stand for an additional hour at about 25° C. The oily reaction product is separated and washed by decantation with several portions of water. It is crude α-cyano-p-fluorobenzyl benzenesulfonate of the formula

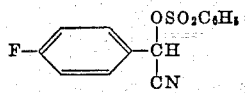

To a solution of 29 parts of α-cyano-p-fluorobenzyl benzenesulfonate and 17 parts of benzenesulfonyl chloride in 50 parts of acetone is added, portion-wise over a 30-minute period with agitation, 15 parts of thiourea. Agitation is continued for 2 hours, after which the precipitated product is collected. This separated product is extracted with acetone, and the acetone extract is combined with the original acetone filtrate. The product obtained by concentrating the combined acetone solution and diluting it with water is purified by dissolving it in dilute potassium hydroxide solution, filtering the solution from an insoluble residue, and acidifying the filtrate with dilute hydrochloric acid, whereby there is obtained reprecipitated α-(p-fluorophenyl)-α-phenylsulfonylacetonitrile of the formula

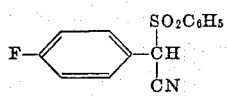

To a solution of 8.5 parts of α-(p-fluorophenyl)-α-phenylsulfonylacetonitrile and 7 parts of potassium hydroxide in 150 parts of water there is added 2 parts of acrylonitrile. The mixture is stirred for 18 hours at about 25° C. after which the insoluble product is collected, washed with water, and dried. For subsequent operations it is satisfactory for use without further purification. This compound is α-(p-fluorophenyl)-α-phenylsulfonylpentanedinitrile of the formula

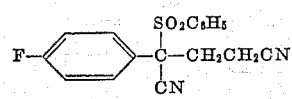

A mixture of 4 parts of α-(p-fluorophenyl)-α-phenylsulfonylpentanedinitrile in 40 parts of concentrated sulfuric acid is shaken intermittently at about 25° C. for 3 hours. With external cooling and caution, there are then added 40 parts of water followed by 100 parts of acetic acid, and the mixture is heated under reflux for 3 hours. The cooled mixture is poured into ice water, with stirring, and the precipitated product is collected and washed with water. This product is extracted with 100 parts of 3% potassium hydroxide solution, and the alkaline extract is filtered from an insoluble residue. The filtrate is treated with solid carbon dioxide, and the reprecipitated 3-(p-fluorophenyl)-3-phenylsulfonyl-2,6-piperidinedione is collected and washed with water. This compound has in-frared absorption maxima at about 3.1, 5.9, 7.6, and 8.7 microns and has the structural formula

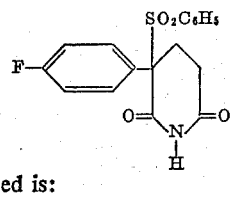

What is claimed is:
1. A compound of the formula

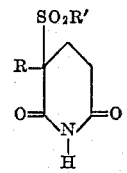

wherein R is a member of the class consisting of phenyl and halophenyl radicals, and R' is a member of the class consisting of lower alkyl, phenyl, and halophenyl radicals.

2. A compound of the formula

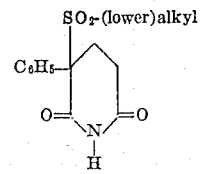

3. 3-phenyl-3-ethylsulfonyl-2,6-piperidinedione.
4. 3-phenyl-3-phenylsulfonyl-2,6-piperidinedione.
5. A compound of the formula

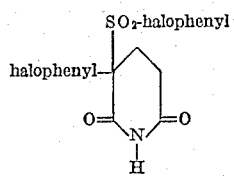

6. 3-(p-chlorophenyl)-3-(p-chlorophenylsulfonyl)-2,6-piperidinedione.
7. A compound of the formula

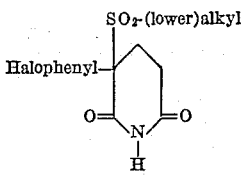

8. 3-(2,4-dichlorophenyl)-3-methylsulfonyl-2,6-piperidinedione.
9. In a process for the manufacture of a compound of the formula

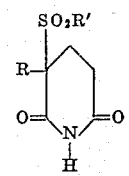

wherein R is a member of the class consisting of phenyl and halophenyl radicals, and R' is a member of the class consisting of lower alkyl, phenyl, and halophenyl radicals, the steps which comprise subjecting a compound of the formula

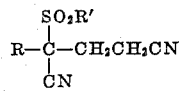

to acidic hydrolysis and ring closure, and isolating the reaction product.

No references cited.